US008812361B2

(12) United States Patent
Petronelli et al.

(10) Patent No.: US 8,812,361 B2
(45) Date of Patent: Aug. 19, 2014

(54) SYSTEM AND METHOD OF TARGETED ADVERTISEMENT

(75) Inventors: Anthony Petronelli, San Jose, CA (US);
Steven Gemelos, San Jose, CA (US);
Raghvendra Savoor, Walnut Creek, CA (US)

(73) Assignee: AT&T Intellectual Properties I, L.P., Atlanta, GA (US)

( * ) Notice: Subject to any disclaimer, the term of this patent is extended or adjusted under 35 U.S.C. 154(b) by 770 days.

(21) Appl. No.: 12/179,415

(22) Filed: Jul. 24, 2008

(65) Prior Publication Data

US 2010/0023338 A1    Jan. 28, 2010

(51) Int. Cl.
*G06Q 30/00* (2012.01)

(52) U.S. Cl.
USPC ..... 705/14.49; 705/35; 705/14.51; 705/14.53

(58) Field of Classification Search
USPC ................ 705/14.41, 35, 14.49, 14.51, 14.53
See application file for complete search history.

(56) References Cited

U.S. PATENT DOCUMENTS

| | | | |
|---|---|---|---|
| 7,707,507 B1 * | 4/2010 | Rowe et al. ................. | 715/742 |
| 7,806,329 B2 * | 10/2010 | Dmitriev et al. ............. | 235/383 |
| 2004/0037319 A1 | 2/2004 | Pandya | |
| 2004/0122730 A1 * | 6/2004 | Tucciarone et al. ........... | 705/14 |
| 2004/0139025 A1 * | 7/2004 | Coleman ....................... | 705/51 |
| 2004/0152517 A1 | 8/2004 | Hardisty et al. | |
| 2004/0165006 A1 | 8/2004 | Kirby et al. | |
| 2005/0288959 A1 * | 12/2005 | Eraker et al. ................. | 705/1 |
| 2006/0128469 A1 | 6/2006 | Willis et al. | |
| 2006/0184886 A1 * | 8/2006 | Chung et al. ................. | 715/758 |
| 2006/0212350 A1 * | 9/2006 | Ellis et al. .................... | 705/14 |
| 2006/0293921 A1 * | 12/2006 | McCarthy et al. ............ | 705/2 |
| 2007/0064702 A1 | 3/2007 | Bates et al. | |
| 2007/0067297 A1 * | 3/2007 | Kublickis ..................... | 707/9 |
| 2007/0078720 A1 | 4/2007 | Ravikumar et al. | |
| 2007/0243936 A1 | 10/2007 | Binenstock et al. | |
| 2007/0244750 A1 | 10/2007 | Grannan et al. | |
| 2007/0297448 A1 | 12/2007 | Heikens et al. | |
| 2008/0010206 A1 * | 1/2008 | Coleman ....................... | 705/51 |
| 2008/0015927 A1 * | 1/2008 | Ramirez ....................... | 705/10 |

(Continued)

OTHER PUBLICATIONS

"PlusNet: Going for the Gaming Niche," Telebusillis A Journey Through the the Baffling Puzzle That Is Telcoland, Sep. 20, 2007, 5 pages.

(Continued)

*Primary Examiner* — Lalita M Hamilton
(74) *Attorney, Agent, or Firm* — Toler Law Group, PC

(57) ABSTRACT

Systems and methods of targeted advertisement are disclosed. In an embodiment, the method includes performing a deep packet inspection process of packet traffic within at least a portion of a communication network. The deep packet inspection process includes determining source data and destination data from the packet traffic without inspecting packet payload data. The method includes receiving aggregate demographic data of users that are associated with at least some of the packet traffic and generating an anonymous first profile of a first user based on first data acquired via the deep packet inspection process and based on the aggregate demographic data. The method also includes retrieving first user profile data from the anonymous first profile and sending the first user profile data to an advertisement system to determine a targeted advertisement based on the first user profile data. The targeted advertisement is displayed to a second user while the second user is participating in a multi-user activity with the first user.

24 Claims, 6 Drawing Sheets

(56) References Cited

U.S. PATENT DOCUMENTS

| | | | | |
|---|---|---|---|---|
| 2008/0040225 A1* | 2/2008 | Roker | | 705/14 |
| 2008/0092159 A1* | 4/2008 | Dmitriev et al. | | 725/34 |
| 2008/0102947 A1 | 5/2008 | Hays et al. | | |
| 2008/0113674 A1* | 5/2008 | Baig | | 455/456.3 |
| 2008/0248815 A1* | 10/2008 | Busch | | 455/456.5 |
| 2008/0270579 A1* | 10/2008 | Herz et al. | | 709/219 |
| 2010/0082439 A9* | 4/2010 | Patel et al. | | 705/14.72 |
| 2011/0066730 A1* | 3/2011 | Julia et al. | | 709/226 |

OTHER PUBLICATIONS

Bobby White, "Watching What You See on the Web," Wall Street Journal, Dec. 6, 2007, 3 pages.

Thomas Claburn, "Privacy vs. Personalization: Can Advertisers Ward Off Looming Threat of Do Not Track List," Information Week, http://www.informationweek.com/story/showArticle.jhtml?articleID=202804307, Nov. 10, 2007, 7 pages.

"ISPs Employ New Tracking, Ad Technology, NebuAd's deep packet inspection behavioral advertising," Broadband DSL Reports.com, http://www.dslreports.com/shownews/90008, Dec. 6, 2007, 16 pages.

Tim Waters, "Programmable Deep Packet Inspections (DPI) for Service Providers," Broadband Technology Group, http://www.convergedigest.com/bp/bp1.asp?ID=500, Dec. 17, 2007, 6 pages.

Jeff Chester, "The End of the Internet?," The Nation., http://www.thenation.com/doc/20060213/chester, Feb. 1, 2006, 4 pages.

"Broadband Remote Access Server," Wikipedia <http://enwikipedia.org/wiki/Broadband_Remote_Access_Server> retrieved Apr. 21, 2008, 1 page.

* cited by examiner

SYSTEM AND METHOD OF TARGETED ADVERTISEMENT

FIELD OF THE DISCLOSURE

The present disclosure is generally related to systems and methods of targeted advertisement.

BACKGROUND

Public networks such as the Internet enable geographically distributed users to communicate and participate in common activities. As broadband network connections become increasingly common, networked users may engage in activities that provide a rich experience, such as via multimedia content, sophisticated online gameplay, or other factors. For example, multiplayer Internet gaming and social networking services enable geographically distributed users to interact and participate in social activities via the Internet.

DETAILED DESCRIPTION

Figure 1:
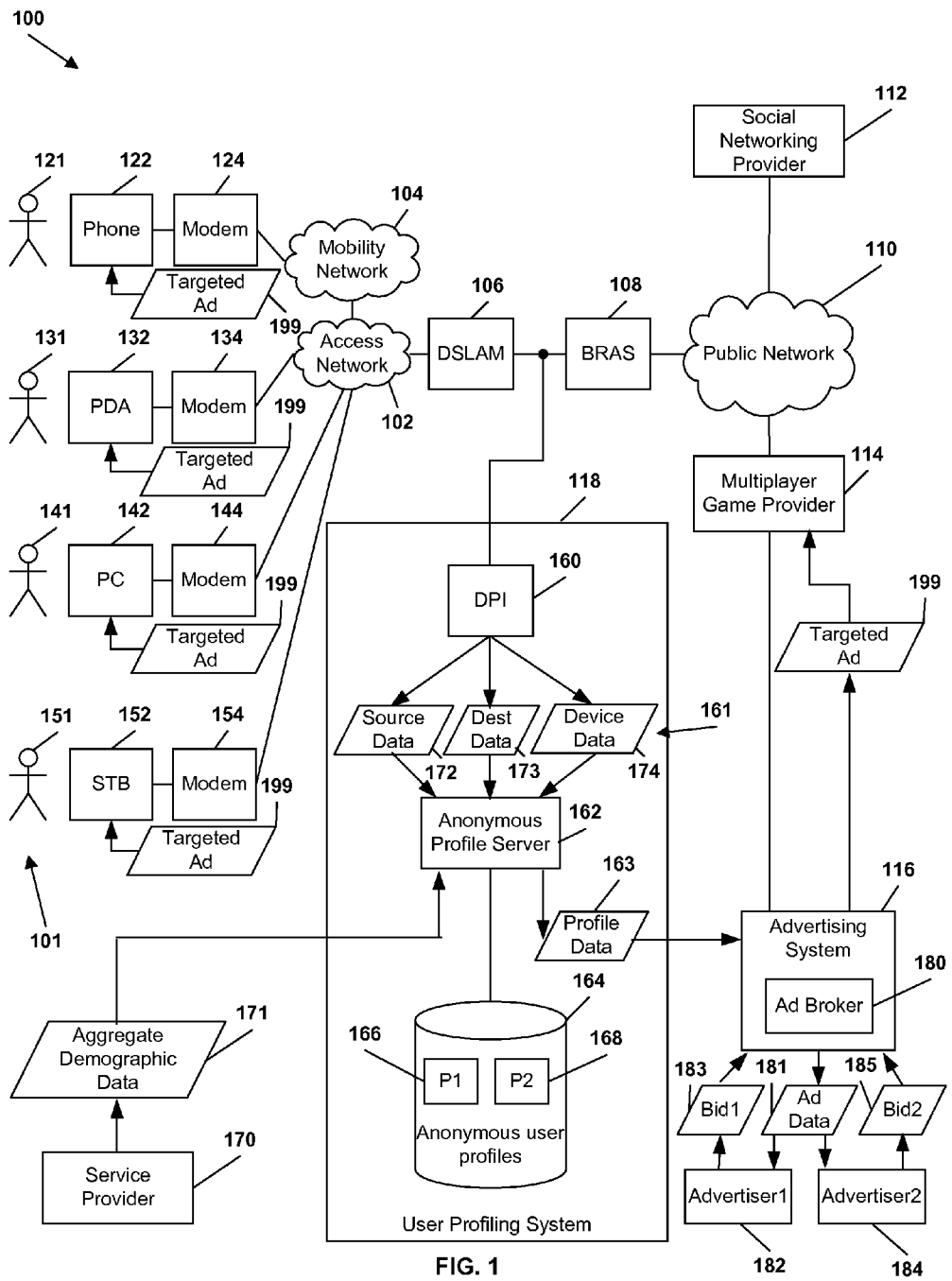
FIG. 1 is a block diagram of a first particular embodiment of a targeted advertisement system.

A targeted advertisement system is disclosed that includes processing logic and a memory accessible to the processing logic. The memory includes a deep packet inspection module executable by the processing logic to extract packet data including packet source data and packet destination data from packet traffic within a communication network without inspecting packet payload data. The memory also includes an advertisement result module executable by the processing logic to use the packet data that is extracted by the deep packet inspection module to identify a targeted advertisement to be presented to a group of users participating in a multi-user activity, to associate the targeted advertisement with a first profile of a first user in the group of users and with a second profile of a second user in the group of users, and to generate tracking data that indicates activities of the first user or the second user corresponding to the targeted advertisement.

In another embodiment, a method of targeted advertisement is disclosed that includes performing a deep packet inspection process of packet traffic within at least a portion of a communication network. The deep packet inspection process includes determining source data and destination data from the packet traffic without inspecting packet payload data. The method includes receiving aggregate demographic data of users that are associated with at least some of the packet traffic and generating an anonymous first profile of a first user based on first data acquired via the deep packet inspection process and based on the aggregate demographic data. The method also includes retrieving first user profile data from the anonymous first profile and sending the first user profile data to an advertisement system to determine a targeted advertisement based on the first user profile data. The targeted advertisement is displayed to a second user while the second user is participating in a multi-user activity with the first user.

In another particular embodiment, a graphical user interface is disclosed that includes an activity display area to display graphical data associated with a multi-user activity and an advertisement display area to display advertisement data substantially concurrently with displaying the graphical data. The advertisement data is received by multiple users of the multi-user activity based on anonymous profile data associated with a first user of the multi-user activity. The anonymous profile data includes data extracted from data packets corresponding to the first user via a deep packet inspection process that retrieves non-payload packet data. The anonymous profile data further includes aggregate demographic data received from a service provider and correlated with an anonymous profile of the first user.

In another embodiment, a computer-readable medium is disclosed having instructions that are executable to cause a processor to receive anonymous player profile data corresponding to multiple players concurrently participating in a multi-user game. The anonymous player profile data is extracted from network packet data via a deep packet inspection process that retrieves non-payload packet data, and the anonymous player profile data is correlated with aggregate demographic data based on location and subscription information. The computer-readable medium also includes instructions that are executable to cause the processor to select a targeted advertisement based on the anonymous player profile data, and instructions that are executable to cause the processor to send the targeted advertisement to be displayed to the multiple players participating in the multi-user game.

Referring to FIG. 1, a first illustrative embodiment of a system is depicted and generally designated 100. The system 100 includes an access network 102 coupled to a mobility network 104. The access network 102 is further coupled to a digital subscriber line access multiplexer (DSLAM) 106. The DSLAM 106 is coupled to a broadband remote access server (BRAS) 108. The BRAS 108 is in communication with a social networking provider 112 and with a multiplayer game provider 114 via a public network 110, such as the Internet.

An advertising system 116 is in communication with the multiplayer game provider 114, and may provide one or more targeted advertisements 199 to the multiplayer game provider 114, to the social networking provider 112, or any combination thereof. A user profiling system 118 is coupled to the DSLAM 106. The user profiling system 118 is configured to receive aggregate demographic data 171 from one or more service providers 170. For example, the one or more service providers 170 may include providers of Internet access service, telecommunications services, other data network services, or any combination thereof.

A first group of users 101 includes a first user 121, a second user 131, a third user 141, and a fourth user 151. The first user 121 is illustrated having access to a wireless telephone 122. The wireless telephone 122 is coupled to the mobility network 104 via a modem 124. The second user 131 is shown having access to a personal digital assistant (PDA) 132. The PDA 132 is in communication with the access network 102 via a modem 134. The third user 141 is illustrated having access to a personal computer (PC) 142. The PC 142 is in communication with the access network 102 via a third modem 144. The fourth user 151 is illustrated having access to a set-top box (STB) device 152. The STB 152 is in communication with the access network 102 via a fourth modem 154. The modems 124, 134, 144, 154 may include any device or interface to enable network communication, and may be internal to the wireless telephone 122, the PDA 132, the PC 142, and the STB 152, respectively.

In a particular embodiment, packet communication data between one or more users of the first group of users 101 and the social networking provider 112 or the multiplayer game provider 114 are inspected and captured by the user profiling system 118. The user profiling system 118 may be adapted to maintain anonymity of the users. Profile data 163 may be provided by the user profiling system 118 to the advertising system 116 to generate one or more targeted advertisements 199 to display to a group of users participating concurrently in a multi-user activity, such as a social network activity provided by the social networking provider 112, or a multiplayer game provided by the multiplayer game provider 114.

In a particular embodiment, the user profiling system 118 includes a deep packet inspection (DPI) module 160. The DPI module 160 may be configured to examine packets, such as packets communicated between the DSLAM 106 and the BRAS 108, and to extract packet data 161, such as source data 172, destination data 173, and device data 174, without inspecting a payload of the communication packets. The user profiling system 118 may also include an anonymous profile server 162. The anonymous profile server 162 may be configured to receive the extracted packet data 161 and to generate one or more anonymous user profiles 164. In addition, the anonymous profile server 162 may be adapted to receive the aggregate demographic data 171 and to correlate at least a portion of the aggregate demographic data 171 to profiles within the anonymous user profiles 164, such as a first anonymous user profile 166, or a second anonymous user profile 168. In addition, the anonymous profile server 162 may be configured to retrieve the profile data 163 from at least one of the anonymous user profiles 166 or 168, and to provide the profile data 163 to the advertising system 116.

In a particular embodiment, the advertising system 116 includes an advertisement broker 180. The advertisement broker 180 may be configured to receive one or more bids from advertisers, such as from a first advertiser 182 and a second advertiser 184. For example, the advertising system 116 may receive data indicating particular characteristics of one or more users of a group of users that may receive an advertisement, such as the profile data 163 from the user profiling system 118. The advertisement broker 180 may provide advertising data 181, indicating an availability of an advertisement and one or more characteristics received via the profile data 163, to the first advertiser 182 and to the second advertiser 184. In response, the advertisement broker 180 may receive a first bid 183 from the first advertiser 182, and a second bid 185 from the second advertiser 184. The advertisement broker 180 may be configured to select one or more targeted advertisements based on the first bid 183, the second bid 185, other bids (not shown), or any combination thereof. The advertising system 116 may be adapted to provide a selected advertisement to be displayed to a group of users that may be participating in a multi-user online activity. For example, the advertising system of 116 may provide the targeted advertisement 199 to be displayed to the first group of users 101 participating in an activity provided by the social networking provider 112 or the multiplayer game provider 114.

During operation, one or more of the users of the group of users 101 may participate in a multi-user online activity, such as a multiplayer game provided by the multiplayer game provider 114, or a social networking activity provided by the social networking provider 112. For example, the first user 121 may participate via the wireless telephone 122 coupled to the public network 110 via the mobility network 104 and the access network 102. The second user 131 may participate via the PDA 132 coupled to the public network 110 via the access network 102. The third user 141 may participate using the PC 142 that is coupled to the public network 110 via the access network 102, and the fourth user 151 may participate using the STB 152 in communication with the public network 110 via the access network 102. Communications between the first group of users 101 and the multi-user activity, such as a multiplayer game, may include one or more data packets that are inspected by the DPI module 160 of the user profiling system 118.

The DPI module 160 may inspect the source data 172, destination data 173, and device data 174 of packet traffic between the DSLAM 106 and the BRAS 108, and may provide the extracted packet data 161 to the anonymous profile server 162. The anonymous profile server 162 may execute logic to identify and to correlate the extracted packet data 161 to one or more profiles of the anonymous user profiles 164. For example, the anonymous profile server 162 may create and maintain records corresponding to each user of the group of users 101 based primarily on the extracted data packets 161, by examining destination data indicating Internet sites to which the packets are traveling, and source data indicating sources from which the packets have been generated. In addition, the device data 174 may indicate a type of device or software configuration used by one or more of the users of the first group of users 101, that may distinguish one or more family members using a common access device, such as the wireless telephone 122, the PDA 132, the PC 142, or the STB 152.

In a particular embodiment, the DPI module 160 may be adapted to detect when one or more of the group of users 101 is participating in a multi-user online activity, by extracting source data 172, destination data 173, and device data 174, but without examining the packet payload data, in order to preserve privacy and/or anonymity for the users 121, 131, 141, and 151. Upon detecting that one or more users of the group of users 101 is participating in a multi-user online activity, the anonymous profile server 162 may extract profile data 163 from one or more of the profiles 166 and 168 that corresponds to the detected user, and may send the profile data 163, along with other data identifying the multi-user online activity, to the advertising system 116.

The advertising system 116 may receive the profile data 163 and other data and may solicit bids from advertisers, such as the first bid 183 from the first advertiser 182, and the second bid 185 from the second advertiser 184. The advertising system 116 may select a targeted advertisement, such as the targeted advertisement 199, and may provide the targeted advertisement 199 to the provider of the multi-user online activity, such as the multiplayer game provider 114. The multiplayer game provider 114 may receive the targeted advertisement 199, and may provide data associated with the targeted advertisement 199 to one or more users engaged in the multiplayer game. For example, all of the first group of users 101 may participate in the multiplayer game. The user profiling system 118 may identify the first user 121 as participating in the multi-player game and may send the profile data 163 to the advertising system 116. The profile data 163 may correspond to preferences or purchasing history of the first user 121 as an illustrative, non-limiting example. The multiplayer game provider 114 may receive the targeted advertisement 199 that has been selected based on the profile data 163 corresponding to the first user 121, and may provide the targeted advertisement 199 to each user of the group of users 101, such as the second user 131, the third user 141 and the fourth user 151, in addition to the first user 121. For example, the multiplayer group provider 114 may provide the targeted advertisement 199 for simultaneous display to the group of users 101 during the progression of the multiplayer game.

In this manner, the advertisers 182 and 184 are able to bid for placement of an advertisement that is targeted by the advertiser 182 and 184 based on data extracted from a user profile corresponding to one or more participants in a multiplayer online activity, and to provide the targeted advertisement to multiple users participating in the multi-user online activity. Therefore, the advertiser 182 or 184 may be able to place a targeted advertisement narrowly tailored to fit an interest or preferences of a large group of users engaging in a common activity. Further, the system 100 may enable data mining of the packet data of the group of users 101, generation of the anonymous user profiles 164, detection of the participation of the group of users 101 in the multi-user online activity, solicitation of bids, and placement of advertisements to the group of user 101, without identifying or invading the privacy of any particular user of a group of users 101. For example, in a particular embodiment, no specific (non-aggregated) demographic or personal data is solicited, obtained, or used in the generation of the anonymous user profiles 164. Further, actual packet payload data and information exchanged between any user of the group of users 101 and any Internet application via the access network 102 may be ignored by the DPI module 160. Instead, all information may be extracted, interpolated and correlated purely from the packet source data 172, the destination data 173, and the device data 174, in addition to correlation and processing steps that may be performed at the anonymous profile server 162.

Figure 2:
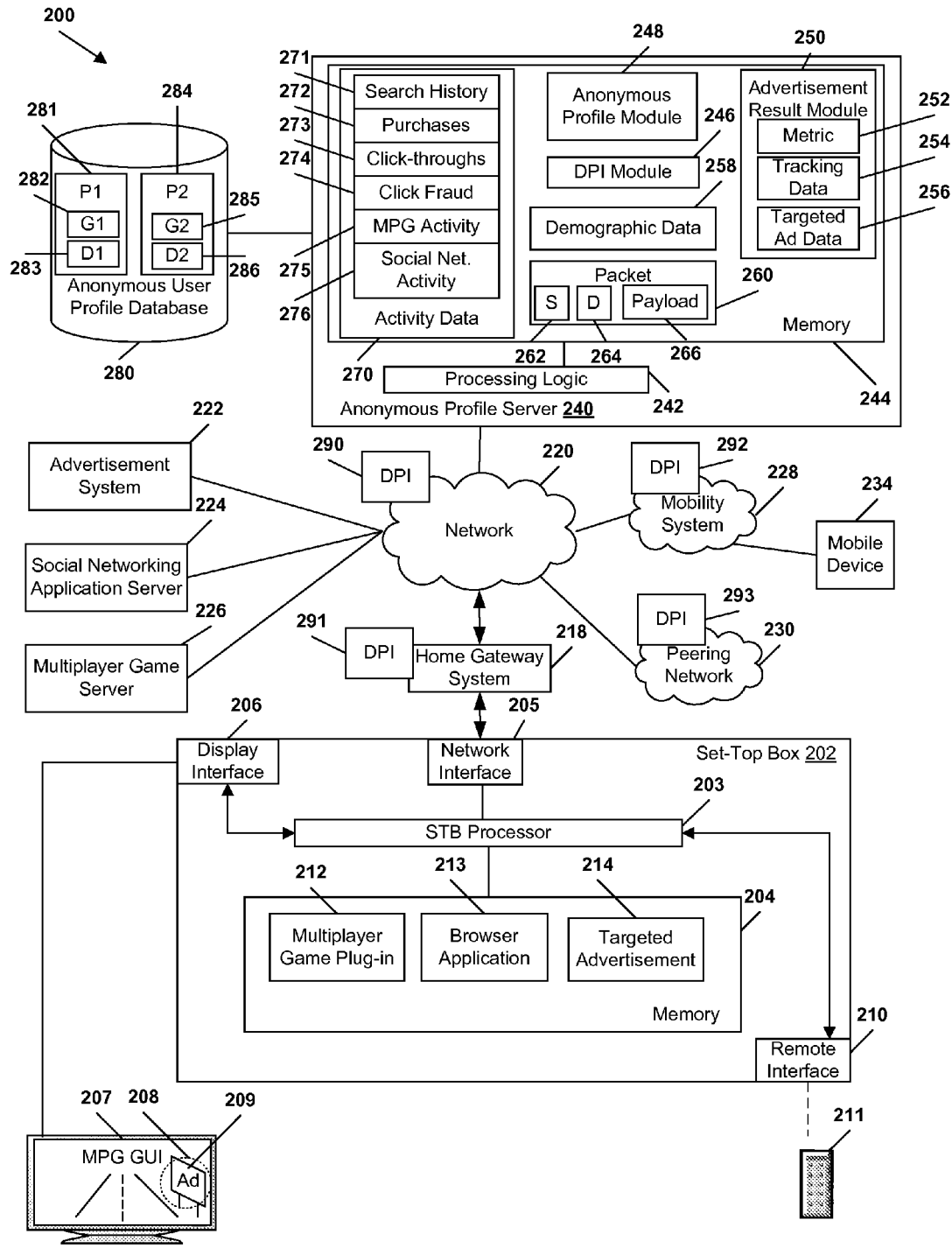
FIG. 2 is a block diagram of a second particular embodiment of a targeted advertisement system.

Referring to FIG. 2, a second illustrative embodiment of a system is depicted and generally designated 200. The system 200 includes a set-top box 202 in communication with an anonymous profile server 240 via a network 220. An advertisement system 222, a social networking application server 224, and a multiplayer game server 226 are also coupled to the network 220. A mobile device 234 is in communication with the network 220 via a mobility system 228. In addition, a peering network 230 is coupled to the network 220. An anonymous user profile database 280 is coupled to the anonymous profile server 240. In a particular embodiment, the system 200 may be implemented as part of the system 100 depicted in FIG. 1.

In a particular embodiment, the set-top box 202 includes a processor 203 coupled to a memory 204. The set-top box 202 communicates with the network 220 via a network interface 205 that is coupled to a home gateway system 218. The set-top box 202 also includes a display interface 206 that is coupled to a display device 207. A remote interface 210 is configured to communicate with a remote control device 211.

In a particular embodiment, the set-top box processor 203 is configured to execute processor instructions stored in the memory 204, such as a multiplayer game plug-in module 212, a browser application 213, and a targeted advertisement module 214. The multiplayer game plug-in module 212 may be executable by the processor 203 to enable a particular behavior of a graphical user interface that is provided at the display device 207 for a multiplayer game. For example, the display device 207 is illustrated as displaying an advertisement display area 208 including an advertisement 209. The multiplayer game plug-in module 212 may enable the display device 207 to display the graphical user interface for the multiplayer game via the browser application 213.

The browser application 213 may be executable by the processor 203 to provide an Internet browser application to interact with a user, such as via the display device 207 and the remote control device 211 or other input device (not shown). The targeted advertisement module 214 may be executable by the processor 203 to receive one or more targeted advertisements via the network interface 205. For example, the set-top box 202 may be configured to receive one or more streams of data related to game play of a multiplayer game that is displayed at the display device 207. The set-top box 202 may further be configured to receive an additional data stream indicating, or associated with, one or more targeted advertisements to be displayed to the user of the set-top box 202 during the progress of the multiplayer game. For example, the targeted advertisement module 214 may be executable by the set-top box processor 203 to display the targeted advertisement as the advertisement 209 in the advertisement display area 208 of the graphical user interface for the multiplayer game.

In a particular embodiment, the anonymous profile server 240 is configured to populate the anonymous user profile database 280 by examining data extracted from packets communicated by the network 220, while preserving an anonymity of users of the system 200. The anonymous profile server 240 includes processing logic 242 and a memory 244 that is accessible to the processing logic 242. The memory 244 includes a deep packet inspection (DPI) module 246, an anonymous profile module 248, an advertisement result module 250, demographic data 258, one or more data packets 260, and activity data 270.

In a particular embodiment, the anonymous profile module 248 is executable by the processing logic 242 to record multiplayer gaming activity data and social networking activity data that is extracted by the deep packet inspection module 246. In a particular embodiment, the anonymous profile module 248 is executable by the processing logic 242 to use packet data that is extracted by the DPI module 246 to generate a first profile 281 based on first activity data associated with a first user and to generate a second profile 284 based on second activity data associated with a second user. The anonymous profile module 248 may further be configured to provide profile data from the first profile 281 and the second profile 284 to the advertising system 222 when the packet data extracted by the deep packet inspection module 246 indicates that the first user and the second user are concurrently active in a multi-user activity. For example, the multi-user activity may be a social networking application provided by the social networking application server 224. As another example, the multi-user activity may be a multiplayer game provided by the multiplayer game server 226.

In a particular embodiment, the deep packet inspection module 246 may be executable by the processing logic 242 to extract packet data including packet source data 262, and packet destination data 264 from packet traffic within the communication network 220 without inspecting packet payload data 266.

In a particular embodiment, the advertising result module 250 is executable by the processing logic 242 to use the packet data that is extracted by the deep packet inspection module 246 to identify a targeted advertisement including targeted advertisement data 256 to be presented to a group of users participating in a multi-user activity. The advertisement result module 250 may further be executable by the processing logic 242 to associate the targeted advertisement with a first profile of the first user in the group of users, such as the first profile 281, and with a second profile of a second user in the group of users, such as the second profile 284. The advertisement result module 250 may also be executable by the processing logic 242 to generate tracking data 254 that indicates activities of the first user or the second user corresponding to the targeted advertisement. In a particular embodiment, the activities of the first user or the second user corresponding to the targeted advertisement include at least one of click-through activities, search activity, purchasing activity, or click fraud activities.

For example, the advertisement result module 250 may be executable by the processing logic 242 to use the packet data extracted by the deep packet inspection module 246 to identify click-through activities of the first user or the second user responsive to the targeted advertisement. As another example, the advertisement result module 250 is executable by the processing logic 242 to use the packet data extracted by the deep packet inspection module 246 to detect search activities of the first user or the second user identified as responsive to content of the targeted advertisement, such as the targeted advertisement data 256. The advertisement result module 250 may also be executable by the processing logic 242 to use the packet data extracted by the deep packet inspection module 246 to detect purchases made by the first user or the second user corresponding to content of the targeted advertisement. The advertisement result module 250 may further be executable by the processing logic 242 to use the packet data extracted by the deep packet inspection module 246 to detect click fraud corresponding to the targeted advertisement.

In a particular embodiment, the demographic data 258 is aggregate demographic data that is received from one or more service providers. For example, the one or more service providers may be providers of Internet access service, telecommunications services, other data network services, or any combination thereof. The service provider may collect demographic data related to subscribers of the service provider, and may provide aggregate demographic data based on location, subscriber characteristics, or other factors, and may provide the demographic data 258 to the anonymous profile server 240. The anonymous profile server 240 may be configured to correlate at least a portion of the demographic data 258 with one or more of the profiles 281, 284 of the anonymous user profile database 280.

In a particular embodiment, the data packet 260 is a representative data packet that is accessed via the network 220. The data packet 260 includes the source data 262, the destination data 264, and the payload data 266. The destination data 264 may include information indicating a web address, one or more keyword identifiers, other textual or alphanumeric indicators associated with an Internet or other data network address or transactions, or any combination thereof. For example, an Internet search query may include as destination data 264 a web address of an Internet search engine, plus one or more keywords, search query terms, search query logic identifiers, or any combination thereof. Similarly, the source data 262 may indicate a web address or other network hardware identifier of an originator of the data packet 260. Thus, substantial information about one or more Internet transactions may be obtained by extracting the source data 262 and the destination data 264, without extracting or inspecting the payload data 266. Therefore, the privacy of a sender or receiver of the packet 260 may be ensured, while useful anonymous commercial information may be extracted.

In a particular embodiment, the activity data 270 includes data extracted by the deep packet inspection module 246 corresponding to one or more data packets 260 examined at the anonymous profile server 240, or at one or more other deep packet inspection (DPI) modules or devices, such as a DPI 290 coupled to the network 220, a DPI 292 coupled to the mobility system 228, a DPI 293 coupled to the peering network 230, and a DPI 291 that is coupled to the home gateway system 218. The activity data 270 may include search history activity data 271, purchases activity data 272, click-through activity data 273, click fraud activity data 274, multiplayer games (MPG) activity data 275, social network activity data 276, other activity data (not shown), or any combination thereof.

In a particular embodiment, the anonymous user profile database 280 includes multiple user profiles that may be generated and maintained while preserving user anonymity. For example, the first anonymous user profile 281 may be associated with a first user and the second anonymous user profile 284 may be associated with a second user. The first anonymous user profile 281 may include first group data 282, and first device data 283. The first group data 282 may indicate one or more multi-user groups commonly associated with the first user. For example, where the first user is identified as commonly interacting in a multiplayer game with a particular group of users, the particular group of users may be identified in the first group data 282.

The first device data 283 may include data associated with network access or communications of the first user. For example, the device data 283 may indicate whether the first user communicates via the network 220 using a mobile wireless device, such as the wireless telephone 122 depicted in FIG. 1, or the PDA 132 depicted in FIG. 1, a personal computer, a set-top box, such as the representative set-top box 202, other devices, or any combination thereof. In a particular embodiment, the second anonymous user profile 284 includes second group data 285 and second device data 286.

For ease of explanation, the various modules 246, 248 and 212-214 have been described in terms of processor-executable instructions. However, those skilled in the art will appreciate that such modules can be implemented as hardware logic, processor-executable instructions, or any combination thereof.

Figure 3:
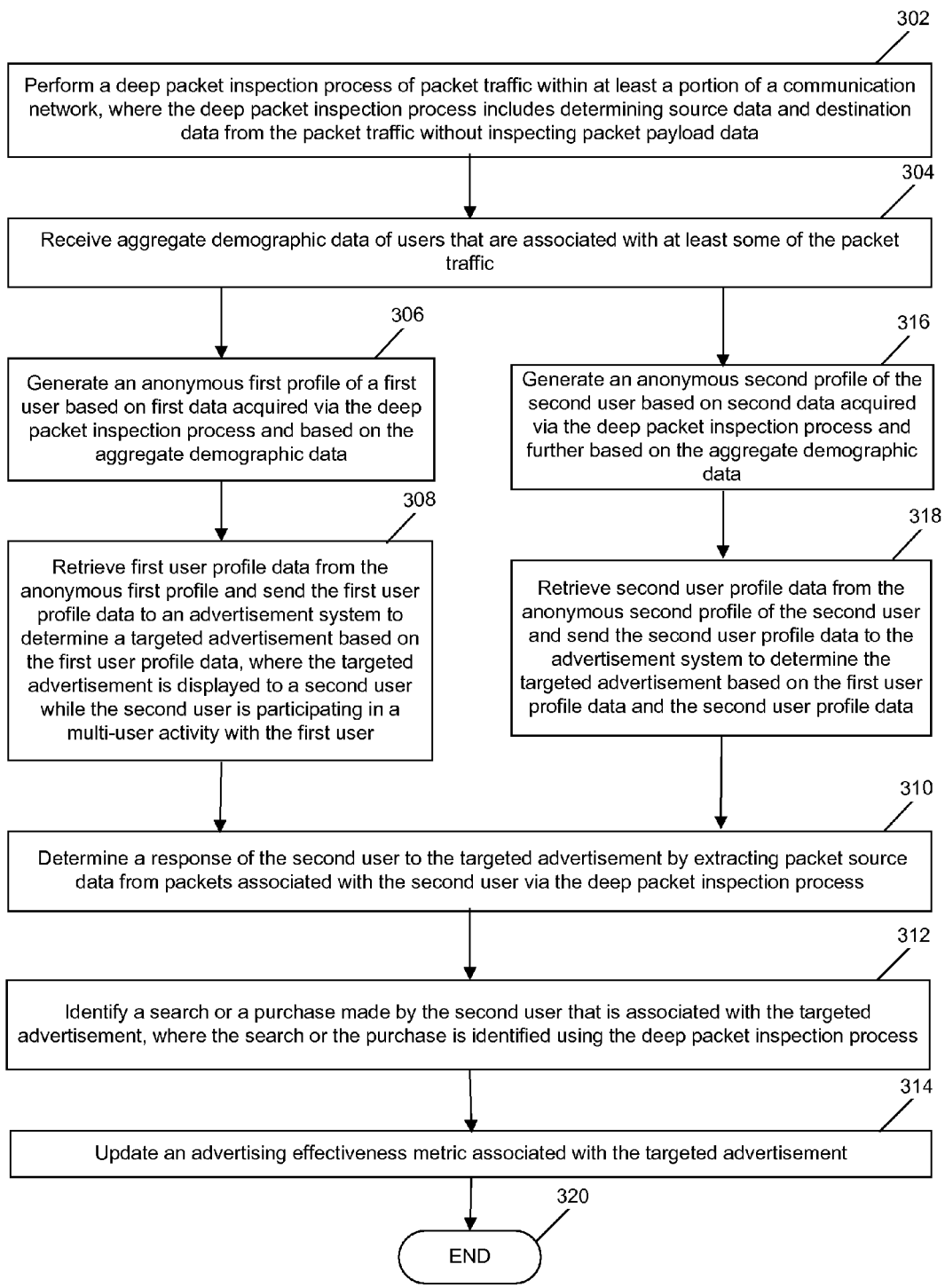
FIG. 3 is a flow diagram of a first particular embodiment of a method of targeted advertisement.

FIG. 3 is a flow diagram of a first particular embodiment of a method of targeted advertisement. In a particular embodiment, the method may be performed at the user profiling system 118 depicted in FIG. 1 or the anonymous profiling server 240 depicted in FIG. 2. At 302, a deep packet inspection process of packet traffic within at least a portion of a communication network is performed, where the deep packet inspection process includes determining source data and destination data from the packet traffic without inspecting packet payload data.

Continuing to 304, aggregate demographic data of users that are associated with at least some of the packet traffic is received. For example the aggregate demographic data may be received via one or more service providers, such as the service provider 170 depicted in FIG. 1. Advancing to 306, an anonymous first profile of a first user is generated based on first data acquired via the deep packet inspection process and based on the aggregate demographic data.

Moving to 308, first user profile data is retrieved from the anonymous first profile and the first user profile data and is sent to an advertisement system to determine a targeted advertisement based on the first user profile data, where the targeted advertisement is displayed to a second user while the second user is participating in a multi-user activity with the first user. For example, the advertisement system may include an advertisement broker to associate the targeted advertisement with the multi-user activity, such as the advertisement broker 180 depicted in FIG. 1. The targeted advertisement may be provided to the first user and to the second user via a graphical user interface associated with the multi-user activity.

For example, the multi-user activity may be a multiplayer game, and the participation of the first user in the multiplayer game may be determined by analyzing the source data and the destination data that is extracted by the deep packet inspection process. As another example, the multi-user activity may include an online social networking activity, and the participation of the first user in the online social networking activity may be determined by analyzing the source data and the destination data that is extracted by the deep packet inspection process.

In a particular embodiment, participation of the first user in the multi-user activity is determined at least partially based on identifying a device signature from communication device data that is associated with the first user and that is extracted by the deep inspection packet process. In addition, the participation of the first user in the multi-user activity may be further based on a time of day, a category of the multi-user activity, a selection made by the first user, or a determination of other participants in the multi-user activity, as illustrative examples.

Proceeding to 310, in a particular embodiment, a response of the second user to the targeted advertisement is determined by extracting packet source data from packets associated with the second user via the deep packet inspection process. For example, the targeted advertisement may be presented as a link via a multi-user activity interface, and a selection of the link by the second user may cause one or more packets to be communicated that can be identified via the packet source and destination data as responsive to a selection of the targeted advertisement.

Continuing to 312, in a particular embodiment, a search or a purchase made by the second user that is associated with the targeted advertisement is identified using the deep packet inspection process. For example, the search or purchase made by the second user may occur concurrently with the multi-user activity, or may occur days, weeks, or even months after the second user receives the targeted advertisement. Advancing to 314, in a particular embodiment, an advertising effectiveness metric associated with the targeted advertisement is updated. The method terminates at 320.

The targeted advertisement may be selected at the advertisement system based on profile data associated with more than one user. For example, where multiple users are identified as participating concurrently in the multi-user activity, profile data associated with one or more of the participating users may be provided to the advertisement system. As illustrated at 316, in a particular embodiment, an anonymous second profile of the second user is generated based on second data acquired via the deep packet inspection process and further based on the aggregate demographic data. Moving to 318, in a particular embodiment, second user profile data is retrieved from the anonymous second profile of the second user and the second user profile data and is sent to the advertisement system to determine the targeted advertisement based on the first user profile data and the second user profile data.

Figure 4:
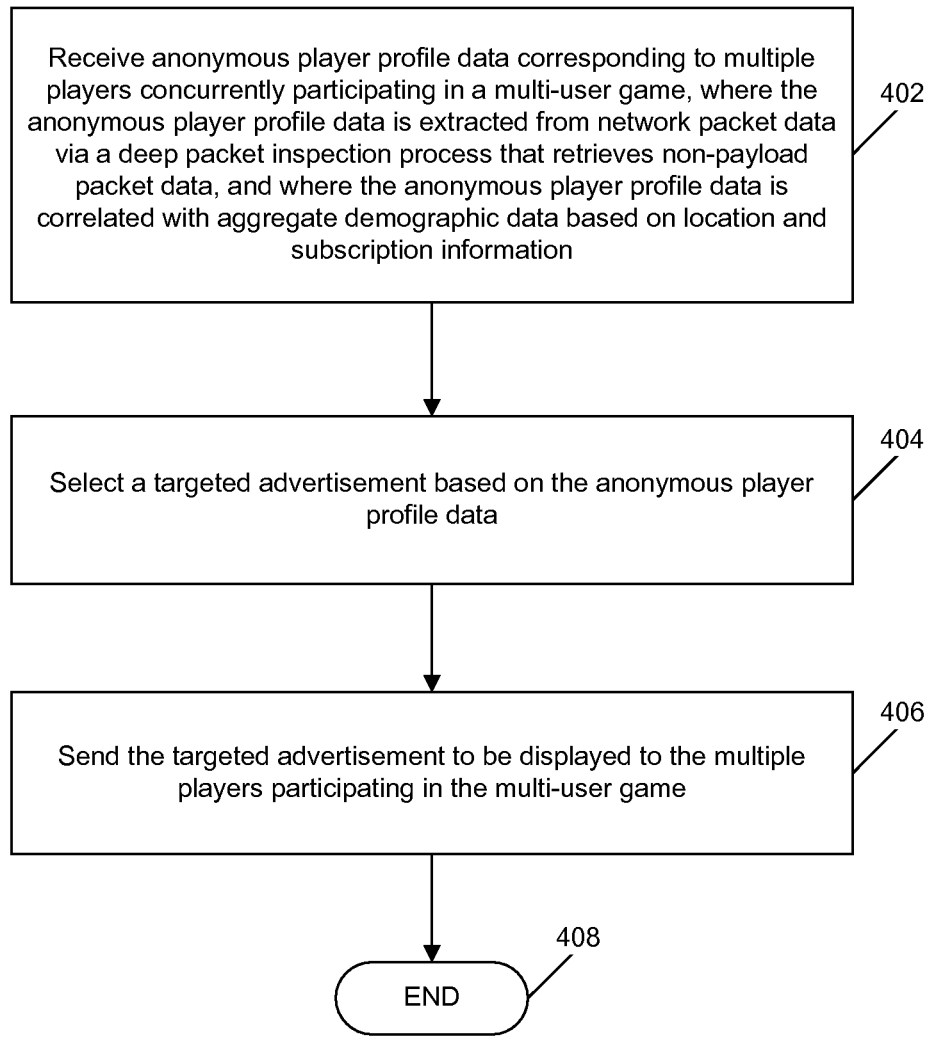
FIG. 4 is a flow diagram of a second particular embodiment of a method of targeted advertisement.

FIG. 4 is a flow diagram of a second particular embodiment of a method of targeted advertisement. In a particular embodiment, the method may be performed at the advertising system 116 depicted in FIG. 1 or the advertising system 222 depicted in FIG. 2. For example, the method may be performed by one or more servers executing operational instructions at one or more processing logic units.

At 402, anonymous player profile data corresponding to multiple players concurrently participating in a multi-user game is received. The anonymous player profile data is extracted from network packet data via a deep packet inspection process that retrieves non-payload packet data. The anonymous player profile data is correlated with aggregate demographic data based on location and subscription information. For example, the anonymous player profile date may be the profile date 163 depicted in FIG. 1.

Continuing to 404, a targeted advertisement is selected based on the anonymous player profile data. For example, the targeted advertisement may be selected from multiple advertisements at an advertisement brokerage system, such as the advertisement broker 180 depicted in FIG. 1. The targeted advertisement may be selected in a process that includes distributing advertisement data to multiple advertisers, receiving bids from the advertisers, and selecting from among the received bids. For example, the targeted advertisement may be selected by selecting a largest bid price from the received bids.

Advancing to 406, the targeted advertisement is sent to be displayed to the multiple players participating in the multi-user game. For example, the targeted advertisement may be provided to or sent to the multiplayer game provider 114 depicted in FIG. 1, to be distributed to game participants. As another example, the targeted advertisement may be provided to or sent to the game participants directly, such as by making the targeted advertisements accessible via a specified network address or uniform resource locator (URL) to be retrieved by networked game devices of the game participants. The method terminates at 408.

Figure 5:
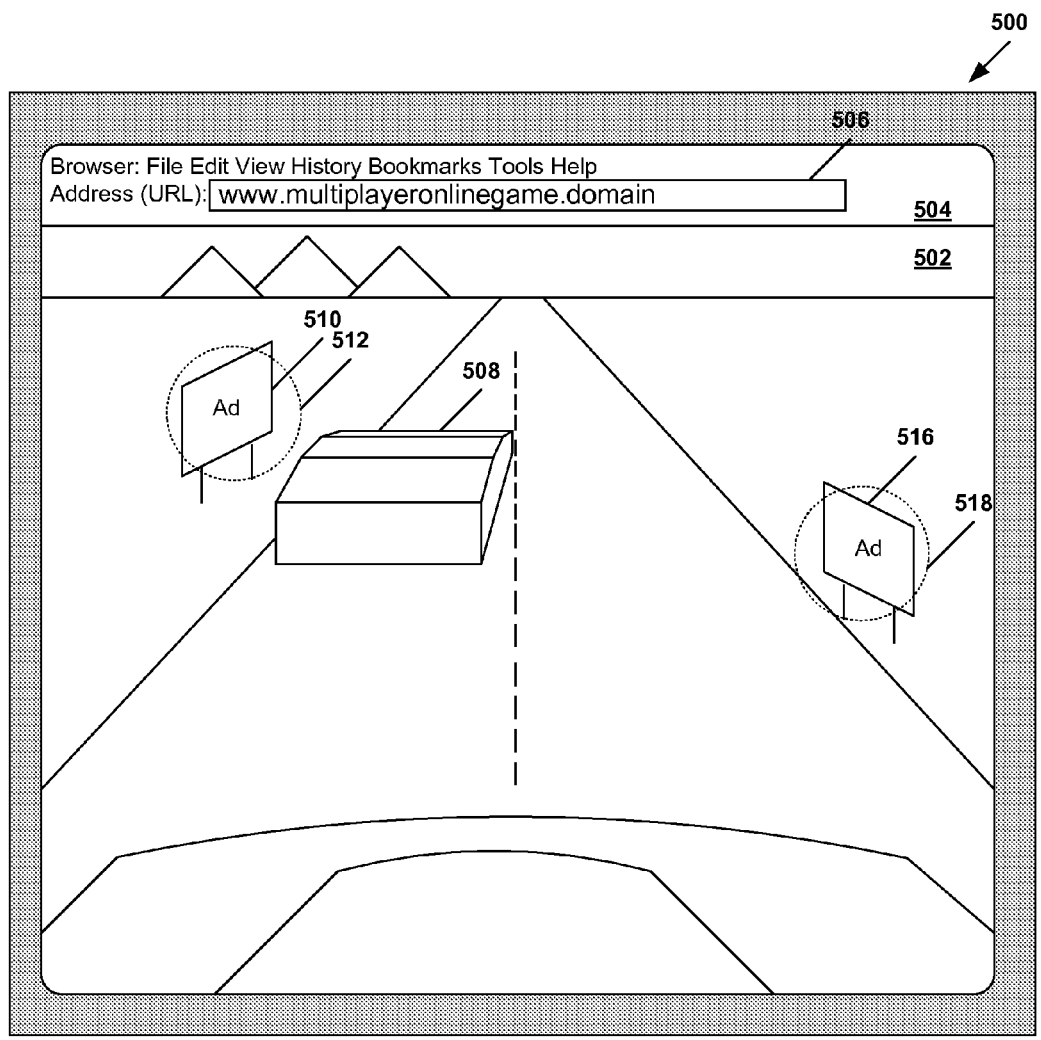
FIG. 5 is a diagram of a particular embodiment of a graphical user interface to deliver targeted advertisements.

FIG. 5 is a diagram of a particular embodiment of a graphical user interface 500 to deliver targeted advertisements. The graphical user interface (GUI) 500 includes an activity display area 502 to display graphical data associated with a multi-user activity, such as graphical data 508 depicting a car in a multiplayer racing game. The GUI 500 also includes a control display area 504 to enable user selection and input of control data, such as an address bar 506 of a browser window.

The graphical user interface (GUI) 500 includes one or more advertisement display areas 512 and 518 to display advertisement data 510 and 516 substantially concurrently with displaying the graphical data 508.

The advertisement data 510 and 516 may received by multiple users of the multi-user activity based on anonymous profile data associated with a first user of the multi-user activity, such as based on the first anonymous user profile P1 166 depicted in FIG. 1 or the first anonymous user profile P1 281 depicted in FIG. 2. The anonymous profile data may include data extracted from data packets corresponding to the first user via a deep packet inspection process that retrieves non-payload packet data. The anonymous profile data may further include aggregate demographic data received from a service provider and correlated with an anonymous profile of the first user.

As depicted, the activity display area 502 and the advertisement display areas 512 and 518 are located within a browser window. A location of one or more of the advertisement display areas 512 and 518 within the browser window may be determined by a browser plug-in application. For example, the browser plug-in application may enable the advertisements display areas 512 and 518 to blend into the game environment, to incorporate the advertisement data 510 and 516 substantially seamlessly with the graphical data 508.

Figure 6:
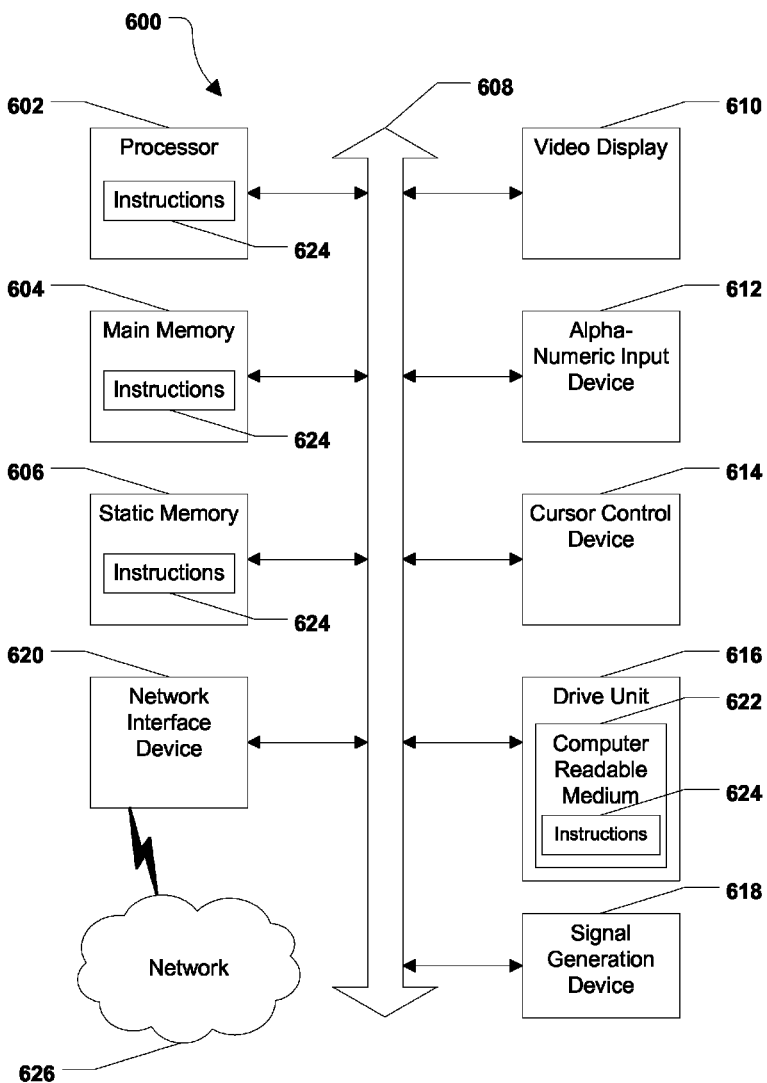
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, including a wireless phone, a personal digital assistant (PDA), a personal computer (PC), a set top box device (STB), a modem, a deep packet inspection (DPI) device, an anonymous profile server, an advertising system, a multiplayer game provider, or a social networking provider, as shown in FIG. 1.

In a networked deployment, the computer system may operate in the capacity of an Internet Protocol television (IPTV) server, such as a video server or application server, or a set-top box device. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs tangibly embodied in a processor-readable medium and may be executed by a processor. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of targeted advertisement, the method comprising:

receiving, at an anonymous profile server, aggregate demographic data of users that are associated with one or more packets exchanged between network devices of a communication network;

generating, at the anonymous profile server, an anonymous first profile of a first user based on first data acquired via a deep packet inspection process and based on the aggregate demographic data, wherein the deep packet inspection process is performed based on the one or more packets and does not inspect packet payload data of the one or more packets, and wherein the deep packet inspection process includes determining source data and destination data from the one or more packets;

retrieving, by the anonymous profile server, first user profile data from the anonymous first profile and sending the first user profile data to an advertisement system to determine a targeted advertisement, wherein the targeted advertisement is determined based on one or more bids received from one or more advertisers, the one or more bids placed based at least in part on the first user profile data, wherein the targeted advertisement is displayed to a second user while the second user is participating in a multi-user activity with the first user, wherein the first user participates in the multi-user activity via a first device associated with the first user and the second user participates in the multi-user activity via a second device associated with the second user, and wherein the targeted advertisement is displayed as an object within an environment displayed in connection with the multi-user activity at the first device and the second device;

determining a response of the second user to the targeted advertisement; and updating an advertising effectiveness metric associated with the targeted advertisement based on the response.

2. The method of claim 1, wherein participation of the first user in the multi-user activity is determined at least partially based on identifying a device signature from communication device data that is determined by the deep packet inspection process, wherein the device signature is associated with the first user.

3. The method of claim 2, wherein the participation of the first user in the multi-user activity is determined based on a time of day, a category of the multi-user activity, a selection made by the first user, or a determination of other participants in the multi-user activity.

4. The method of claim 1, further comprising:

generating, at the anonymous profile server, an anonymous second profile of the second user based on second data determined via the deep packet inspection process and further based on the aggregate demographic data;

retrieving, by the anonymous profile server, second user profile data from the anonymous second profile of the second user; and sending the second user profile data to the advertisement system to determine the targeted advertisement based on the first user profile data and the second user profile data.

5. The method of claim 1, wherein determining the response of the second user to the targeted advertisement comprises determining second source data from one or more particular packets via the deep packet inspection process, wherein the one or more particular packets are exchanged between the network devices of the communication network after the targeted advertisement is displayed, wherein the second source data is associated with the second user.

6. The method of claim 5, further comprising identifying the response based in part on the second source data, wherein the response is associated with the targeted advertisement, and wherein the response is one of a search and a purchase that is made by the second user and that is associated with the targeted advertisement.

7. The method of claim 6, wherein the network devices include one or more of a digital subscriber line access multiplexer, a broadband remote access server, a home gateway system, or any combination thereof.

8. The method of claim 1, wherein the targeted advertisement is displayed to the first user and to the second user via a graphical user interface associated with the multi-user activity, wherein the graphical user interface is generated by the advertising system.

9. The method of claim 1, wherein the multi-user activity is a multiplayer game, and wherein participation of the first user in the multiplayer game is determined by analyzing the source data and the destination data.

10. The method of claim 1, wherein the multi-user activity is an online social networking activity and wherein a participation of the first user in the online social networking activity is determined by analyzing the source data and the destination data.

11. A system comprising:
a processor; and
memory accessible to the processor, the memory including instructions that, when executed by the processor, cause the processor to perform a method comprising:
identifying a targeted advertisement to be presented to a group of users participating in a multi-user activity, wherein the targeted advertisement is determined based on one or more bids received from one or more advertisers, the one or more bids placed based at least in part on user profile data associated with at least one user of the group of users, and wherein each particular user of the group of users participates in the multi-user activity via a particular device associated with the particular user;
displaying the targeted advertisement as an object within an environment displayed in connection with the multi-user activity at the particular device associated with the particular user;
associating the targeted advertisement with a first profile of a first user in the group of users and with a second profile of a second user in the group of users;
generating tracking data that indicates activities that correspond to the targeted advertisement and that are performed by the first user, the second user, or both; and
updating, based on the tracking data, an advertising effectiveness metric associated with the targeted advertisement.

12. The system of claim 11, wherein the activities corresponding to the targeted advertisement include click-through activities, search activities, purchasing activities, click fraud activities, or a combination thereof.

13. The system of claim 11, wherein the method further comprises identifying click-through activities associated with the first user, the second user, or both, and wherein the click-through activities that are identified are responsive to the targeted advertisement.

14. The system of claim 11, wherein the method further comprises detecting search activities associated with the first user, the second user, or both, and wherein the search activities that are detected are responsive to content of the targeted advertisement.

15. The system of claim 11, wherein the method further comprises detecting purchases made by the first user, the second user, or both, and wherein the purchases that are made correspond to content of the targeted advertisement.

16. The system of claim 11, wherein the method further comprises detecting click fraud that corresponds to the targeted advertisement.

17. The system of claim 11, wherein the method further comprises:
determining packet data including packet source data and packet destination data from one or more packets exchanged between network devices within a communication network, wherein the packet data is determined without inspecting packet payload data of the one or more packets;
using the packet data to:
generate the first profile based on first activity data in the packet data associated with the first user; and
generate the second profile based on second activity data in the packet data associated with the second user; and
providing profile data from the first profile and the second profile to an advertising system when the packet data indicates that the first user and the second user are concurrently active in the multi-user activity, wherein a first device is associated with the first user and a second device is associated with the second user, and wherein the first device is located remotely to the second device.

18. The system of claim 17, wherein the method further comprises recording multiplayer gaming activity data and social networking activity data of the packet data.

19. The system of claim 17, wherein the one or more packets are obtained from a home gateway system, a mobility system, a core network, a peering network, or a combination thereof.

20. A computer-readable storage device comprising an article storing instructions that, when executed by a processor, cause the processor to perform a method comprising generating a graphical user interface that comprises:
an activity display area to display graphical data associated with a multi-user activity; and
an advertisement display area to display advertisement data including a targeted advertisement;
wherein the advertisement data is displayed concurrently with the graphical data, and wherein the advertisement display area is integrated within the activity display area as an object within an environment displayed in connection with the multi-user activity;
wherein the advertisement data is received by multiple users of the multi-user activity based on anonymous profile data associated with a first user of the multi-user activity, the anonymous profile data including data that is extracted from packets via a deep packet inspection process and that corresponds to the first user, wherein the data is retrieved from non-payload data associated with the packets that are exchanged between network devices of a communication network, wherein the anonymous profile data is correlated with aggregate demographic data based on location and subscription information, and wherein the targeted advertisement is determined based on one or more bids received from one or more advertisers, the one or more bids placed based at least in part on the anonymous profile data corresponding to the first user;

wherein the anonymous profile data further includes aggregate demographic data received from a service provider and correlated with an anonymous profile of the first user; and wherein each particular user of the multiple users participates in the multi-user activity via a particular device associated with the particular user.

21. The computer-readable storage device of claim 20, wherein the activity display area and the advertisement display area are located within a browser window and wherein a location of the advertisement display area within the browser window is determined by a browser plug-in application.

22. The computer-readable storage device of claim 21, wherein the multi-user activity is a multiplayer game and wherein the environment is within a background displayed in connection with the multiplayer game.

23. A computer-readable storage device comprising an article storing instructions that, when executed by a processor, cause the processor to perform a method comprising:

receiving anonymous player profile data corresponding to multiple players concurrently participating in a multi-user game, wherein each particular player of the multiple players participates in the multi-user game via a particular device associated with the particular player, and wherein the anonymous player profile data is extracted from network packet data via a deep packet inspection process, wherein the network packet data is retrieved from non-payload data associated with one or more network packets exchanged between network devices of a communication network, and wherein the anonymous player profile data is correlated with aggregate demographic data based on location and subscription information;

determining a targeted advertisement based on one or more bids received from one or more advertisers, the one or more bids placed based at least in part on the anonymous player profile data;

sending the targeted advertisement to be displayed concurrently to the multiple players participating in the multi-user game, wherein the targeted advertisement is displayed as an object within an environment displayed in connection with the multi-user game;

determining one or more responses of the multiple players to the targeted advertisement; and updating an advertising effectiveness metric associated with the targeted advertisement based on the one or more responses.

24. The computer-readable storage device of claim 23, wherein the targeted advertisement is determined by an advertisement brokerage system.

* * * * *